R. SMITH, dec'd.

N. E. Smith, Administrator.

MILK-COOLERS.

No. 7,823. Reissued July 31, 1877.

WITNESSES

Robt Everett

James J. Sheehy.

Russell Smith.

INVENTOR

Nelson E. Smith.

administrator.

by Gilmore, Smith & Co.

ATTORNEYS.

N. PETERS, PHOTO-LITHOGRAPHER, WASHINGTON, D. C.

UNITED STATES PATENT OFFICE.

NELSON E. SMITH, OF RICHFORD, VERMONT, ADMINISTRATOR OF RUSSELL SMITH, DECEASED.

IMPROVEMENT IN MILK-COOLERS.

Specification forming part of Letters Patent No. 164,048, dated June 1, 1875; Reissue No. 7,823, dated July 31, 1877; application filed July 14, 1877.

*To all whom it may concern:*

Be it known that RUSSELL SMITH, late of Richford, in the county of Franklin and State of Vermont, did invent certain new and useful Improvements in Milk-Coolers; and I do hereby declare that the following is a full, clear, and exact description of the construction and operation of the same, reference being had to the annexed drawings, making a part of this specification, and to the letters and figures of reference marked thereon.

Figure 1:
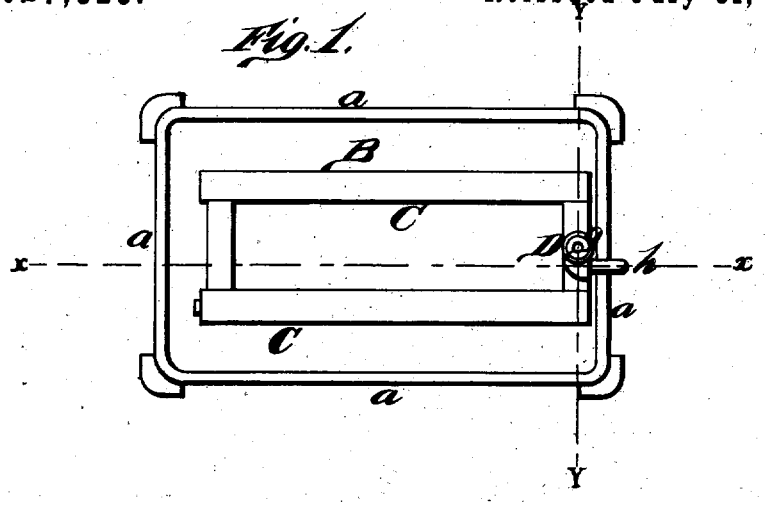
Figure 2:
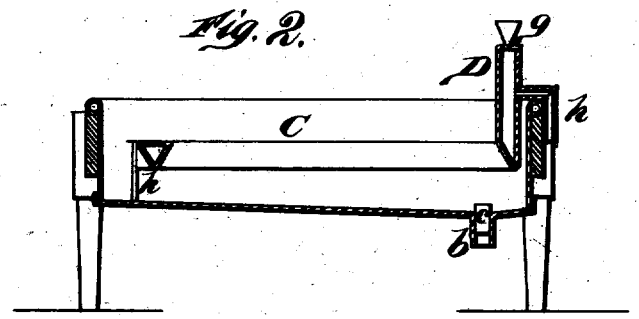
Figure 3:
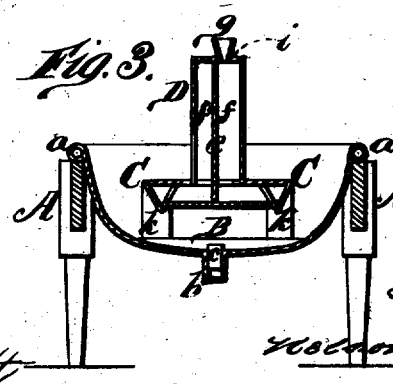

Figure 1 of the drawings is a representation of a plan view of the milk-cooler. Fig. 2 is a longitudinal vertical sectional view of the same, and Fig. 3 is a transverse vertical sectional view.

The object of this invention is to improve the milk-cooling apparatus for which Letters Patent of the United States No. 157,138, and dated the 24th day of November, 1874, were granted to Russell Smith; and the nature of the invention consists, mainly, in a milk-pan having its bottom made flat at one end and rounded at the other end, whereby the pan is made inclined toward the discharge end; and, also, in a cooler consisting of a continuous pipe having an upright centrally-divided trunk, which is provided with a water-supply funnel and an overflow discharge-pipe, whereby water poured into the funnel will make the circuit of the said continuous pipe, and be discharged from the overflow-pipe, all as will be hereinafter explained.

In the annexed drawings, A represents a supporting-frame, on which the improved pan rests by its edges *a*. B is the pan, constructed to fit in the frame A, and having its bottom and sides made of one piece of sheet metal, constructed in such a manner as to have the bottom at one end of the pan flat, and then curving gradually toward the other end, whereby the bottom becomes inclined longitudinally; and it is at its lowest point provided with a draw-off pipe, *b*, in which is a removable plug, *c*. The cooler C is formed of longitudinal and transverse pipes communicating with each other, which pipes are triangular in cross-section. From the middle of the length of one of the transverse pipes of the cooler rises a trunk, D, which is centrally divided by a vertical partition, *e*, which is extended downward and arranged to divide the space in said transverse pipe, as shown in Fig. 3. By this means is formed in the trunk D an inflow-passage, *f*, having a funnel, *g*, and an air-hole, *i*, at its upper end; and an outflow-passage, *f'*, is also formed, provided with an angular discharge-pipe, *h*. One end of the cooler C is supported, by means of legs *k*, upon the bottom of the pan B, and the other end of the cooler is supported upon the edge of the pan B by means of the angular discharge-pipe *h*.

It will thus be seen that the water poured or flowing into the funnel *g* will circulate through the pipes of the cooler, and flow out through the pipe *h*. The hole *i* admits air, and allows the water to flow freely through the funnel without liability of overflowing at this point.

What I claim as new and as the invention of RUSSELL SMITH, and desire to secure by Letters Patent, is—

1. The milk-pan B, having its sides and bottom formed of one piece of sheet metal, with the bottom flat at one end and gradually curved toward the other end to make it inclined longitudinally, substantially as herein set forth.

2. The rectangular cooler C, formed of triangular pipes, in combination with the centrally-divided trunk D, having a feed-funnel, *g*, a hole, *i*, and an angular discharge-pipe, *h*, substantially as described.

In testimony that I claim the above I have hereunto subscribed my name in the presence of two witnesses.

NELSON E. SMITH,
*Administrator to Estate of Russell Smith, deceased.*

Witnesses:
J. G. POWELL,
JOHN N. POWELL.